April 21, 1959 SHINTARO OSHIMA ET AL 2,883,109

DEVICE FOR MAKING ANY DESIRED FREQUENCY CHARACTERISTIC CIRCUIT

Filed Aug. 29, 1955 2 Sheets-Sheet 1

INVENTORS
Shintaro Oshima & Hajime Enomoto
BY Wenderoth, Lind and Ponack
ATTORNEYS INVENTORS
SHINTARO OSHIMA
HAJIME ENOMOTO
BY Wenderoth, Lind & Ponack
Attys.

United States Patent Office 2,883,109

Patented Apr. 21, 1959

2,883,109

DEVICE FOR MAKING ANY DESIRED FREQUENCY CHARACTERISTIC CIRCUIT

Shintaro Oshima, Musashino-shi, Tokyo-to, and Hajime Enomoto, Ichikawa-shi, Japan, assignors to Kokusai Denshin Denwa Co., Ltd., Tokyo, Japan, a Japanese company Application August 29, 1955, Serial No. 531,237

Claims priority, application Japan September 8, 1954

4 Claims. (Cl. 235—183)

This invention relates to a device for making a circuit having any desired frequency characteristics, and in particular, the invention is concerned with a device for making the above circuit based on a new synthesis of filter circuits.

It is an important problem for the wave form transmission to make a network having any desired frequency characteristic. It has hitherto been known to use the combination of filter circuits for the above purpose; however, by resorting to such practice, the design and assembly of the above circuits are made difficult, due to a large number of circuit elements used, such as inductances and capacitors, in case complicated characteristics and sharp cut-off frequency characteristics are required. Furthermore, in the above case, it is difficult to vary quickly the frequency characteristics of the network.

The object of the present invention is to provide a device by which the use of the combination of the above filter circuits is avoided and the above-mentioned defects are eliminated thereby.

In order to attain the above object, the device comprises, a storage equipment for the input signal, a function generator, a multiplier, an integrating circuit and a low pass filter. By computing the impulse response which corresponds to any desired frequency characteristic, and by obtaining the wave form of such impulse response from the above function generator, a network having any complicated frequency characteristics may be made easily, and the frequency characteristics of such network may be quickly varied at will by varying the above impulse response.

Now, it is assumed that $K(f)$ is the frequency characteristic of the circuit. Then, $h(\tau)$, which is the impulse response of such circuit, is defined by the Fourier integral of $K(f)$ as follows:

$$h(\tau)=\int_{-\infty}^{\infty}K(f)\epsilon^{j2\pi f\tau}df \qquad (1)$$

In case $e_1(t)$, which is the input, is applied to such circuit, the output $e_2(t)$ is:

$$e_2(t)=\int_0^{\infty}e_1(t-\tau)h(\tau)d\tau \qquad (2)$$

Namely, the output $e_2(t)$ at the time $t$ is obtained by multiplying the input $e_1(t-\tau)$, at the time $-\tau$, $t$ taken as standard, by the impulse response $h(\tau)$ at the time $+\tau$, $t$ also taken as standard, and then integrating the product with $\tau$.

Generally, the communication signals have a limited frequency band width. Supposing that a signal wave form having a limited band width, W c./s., is applied to a circuit having any frequency characteristic, the output thereof is obtained in the signal wave form having the same limited band width, W c./s. Therefore, it is enough to study the above frequency characteristic within the limited frequency band width, W c./s. It is possible to completely determine the wave form having a limited frequency band with W c./s. based upon the sample values of signal wave form at every time interval of $$\frac{1}{2W}$$

second or less. Therefore, taking the duration of time of $h(\tau)$ which corresponds to the given frequency characteristic as T, reading out the input $e_1(t)$ in the duration T by using a storage equipment such as a magnetic recorder or a storage tube, in compressed form to less than $$t'\left(t'\leq\frac{1}{2W}\right)$$

in the counter-direction of time, multiplying such compressed $e_1(t)$ by the impulse response $h(\tau)$, which is also compressed at the same ratio, integrating the portion of the above product corresponding to T within the time interval $t'$, obtaining such integrated portion as pulse of every $t'$ second, and then passing the above pulse through a low pass filter of W c./s., we can obtain the same wave form as that of the output signal $e_2(t)$ obtained when the input signal $e_1(t)$ is applied to the circuit having a given frequency characteristic.

The invention will now be explained with reference to the drawings, wherein embodiments of the invention are shown by way of example, in which:

Fig. 1 shows the block diagram of one embodiment of the device in accordance with the invention;

Figs. 2*a*, 2*b*, 2*c*, 2*d* and 2*e* are the wave form diagrams showing the principle of the invention; and Figs. 3 and 4 are the block diagrams of other embodiments of the device in accordance with the invention.

In the drawings, 1 is the input terminal, and 2, 3, and 4 are respectively the recording head, the recording tape and the reproducing head, in case a magnetic recorder is employed as storage equipment. The signal, $e_1(t)$, having a limited frequency band width W c./s., is led in the input terminal 1, is applied on the recording head 2, and is recorded on the recording tape 3 moving in the direction shown with an arrow I in Fig. 1. The reproducing head 4 rotates in the same direction as the recording tape 3 at a speed of $$\frac{1}{t'}\left(t'\leq\frac{1}{2W}\right)\text{c./s.}$$

as shown with an arrow II. The speed of the recording tape 3 is so regulated that it moves from the point "*b*" at the inlet of the reproducer to the point "*a*" at the outlet during the period of one rotation of the reproducing head 4, the said speed corresponding to the duration of time T of the impulse response $h(\tau)$ for the given frequency characteristic.

A multiplier is shown at 5, a function generator at 6, an integrating circuit at 7, a low pass filter at 8, and an output terminal at 9.

Assuming that $h(\tau)$, which is the impulse response for a given frequency characteristic, is of the wave form shown in Fig. 2*a*, having the duration of time T, and that the input signal $e_1(t)$ is recorded on the tape 3 by the recording head 2 as shown in Fig. 2*b*, the signal wave form, recorded during the period $a_1-b_1$ which corresponds to the time T, is reproduced in the state compressed to less than $t'$ seconds in the counter-direction of time by virtue of one rotation of the reproducing head 4, as shown by $a_1'$-$b_1'$ in Fig. 2*c*. Similarly, the signal wave form recorded during the period $a_2-b_2$, namely during T seconds after $a_1+t'$ seconds, is $a_2'-b_2'$, and so forth. By this way, $a_2'-b_2'$, $a_3'-b_3'$ etc. are reproduced in the form of compressed wave and applied to the multiplier 5.

On the other hand, the wave form of $h(\tau)$, the impulse response as shown in Fig. 2*a*, is obtained as function of K(*f*) from the Formula 1, and is obtained, in compressed form at the same ratio as that of the input signal $e_1(t)$, as output of the function generating circuit, which is, for example, a combination of Braun tubes, photocells and amplifiers, whereby the impulse response wave form is formed as in Fig. 2*d*. Then, such wave form is synchronised to the rotation of the reproducing head 4, and the wave form voltage of the impulse response compressed at the same ratio as above is applied to the multiplier 5 for every one rotation of 4. A pentode or a heptode is employed as multiplier 5, and, by applying the reproduced output to one of the grids of such tube and the impulse response output to one of the other grids of such tube, an output, which is the product of the two outputs is obtained from the anode thereof. Therefore, the output of the multiplier 5 is the product of $e_1(t-\tau)$ and $h(\tau)$, in which $e_1(t-\tau)$ is the input signal in the duration T compressed to $t'$ second in the counter-direction of time, and $h(\tau)$ is the impulse response compressed at the above ratio. Such output is applied to the integrating circuit 7. If the output of the multiplier 5 is integrated during the period of $t'$ seconds, and the discharge of such integrated voltage is synchronized to the rotation of the reproducing head 4 so that the stored amount will be discharged at every $t'$ seconds at a definite position of the reproducing head 4, pulses which are samples of the output $e_2(t)$ shown by the Formula 1 are obtained at every $t'$ seconds, as shown in Fig. 2*e* as output of integrating circuit. By passing such pulses through the low pass filter of W c./s., we can obtain a continuous wave form, same as the output signal $e_2(t)$ above-mentioned, obtained when the aforementioned input signal $e_1(t)$ is applied to the circuit having a given frequency characteristic.

Figure 1:
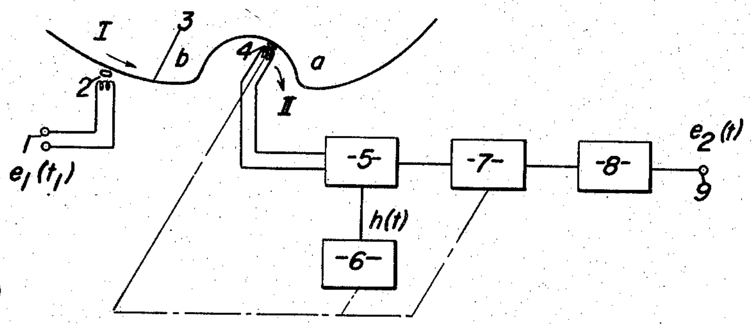
Figure 2A:
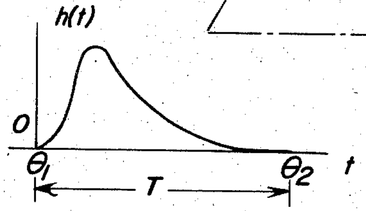
Figure 2B:
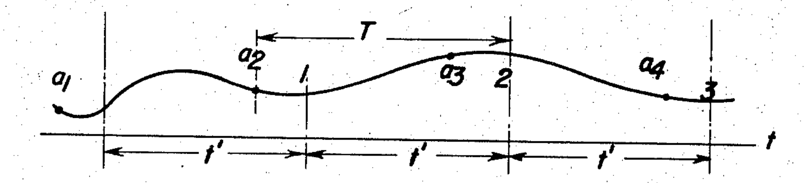
Figure 2C:
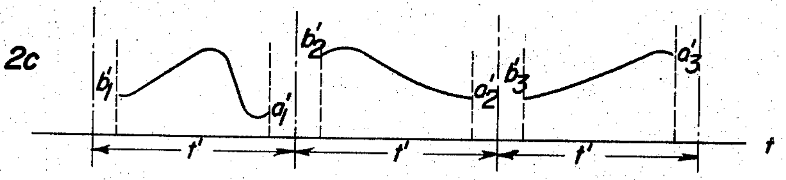
Figure 2D:
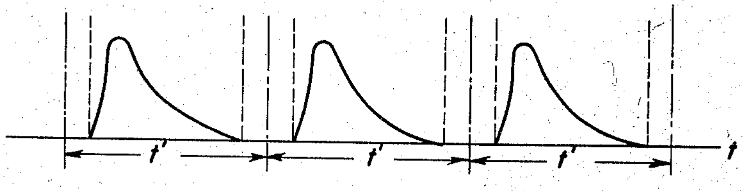
Figure 2E:
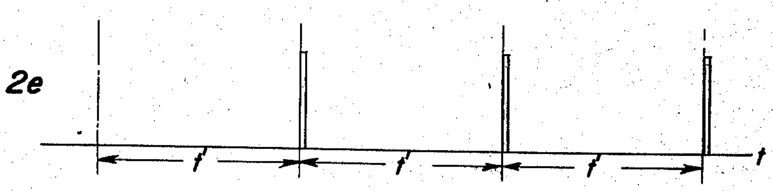
Figure 3:
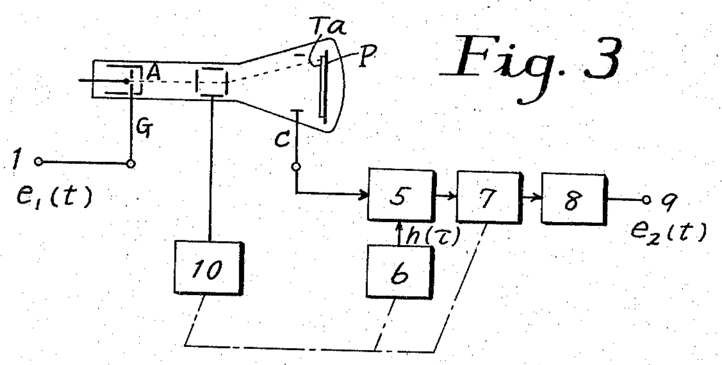
Fig. 3 shows another embodiment of the invention, in which are used, as storage equipment, a storage tube consisting of the grid G, the anode A, the target $T_a$, the backplate P, the collector C etc., and the scanning voltage generator 10, instead of the magnetic recorder of Fig. 1.
Figure 4:
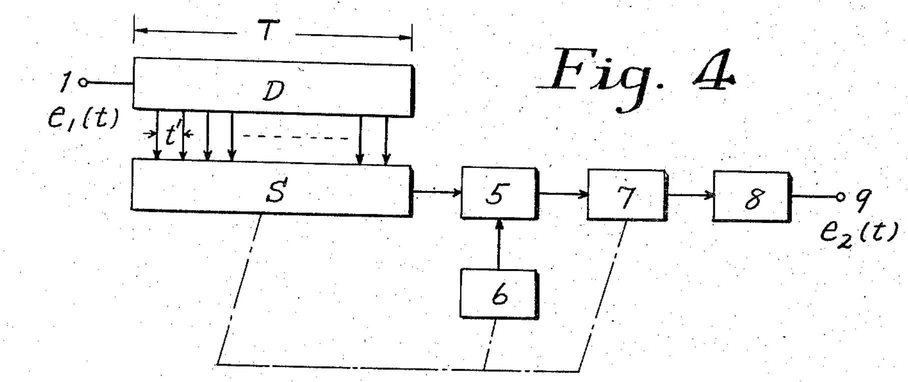
Fig. 4 is also another embodiment of the invention, in which are used, analogue or digital type delay line D and the switching circuit S, instead of the magnetic recorder of Fig. 1.

The detailed explanation of the operation of storage tube, delay line, switching circuit and the like in Figs. 3 and 4 are omitted, because such operation is known in the art. Likewise, the details of the function generator 6 have not been discussed in detail, such a function generator being disclosed by D. J. Mynall in "Nature," a periodical published in Great Britain, vol. 159, No. 4048, page 743, 1947, and D. M. Mackay "Nature," vol. 159, No. 4038, page 406, 1947. See also U.S. Patent No. 2,528,020.

The impulse response $h(\tau)$ can be obtained by calculation irrespective of however complicated the frequency characteristic is. Also, once such impulse response is calculated, the most complicated wave form thereof can be described by a function generator. It is possible to realise simply any circuit satisfying the most complicated frequency characteristic. Therefore, by inserting the device of the present invention at the receiving side of the transmission system such as wireless circuit in which the characteristic is varied with time caused by the fading etc., transmitting signal impulses for the measurement of frequency characteristic from the transmission side, receiving such impulses at the receiving side, calculating, with an electronic computer, the impulse response of the inverse frequency characteristic while measuring constantly the frequency characteristic of such transmission system varying with time, and giving to the function generator such impulse response wave form corresponding to the variation, the compensation of fading and the like can easily be made, and we can expect remarkable effects of the present invention.

We claim:

1. A device for producing a desired frequency characteristic circuit, comprising a storage equipment for continuously recording input signal and then successively reading out said input signal at every time duration which corresponds to the time duration T of impulse response defined by the Fourier integral of a determined frequency characteristic, in a form compressed at the ratio of less than $t'/T$ in the counter direction of time, where $$t' \leq \frac{1}{2W}$$

W being the band width of said input signal, a function generator for generating the wave form voltage of said impulse response also compressed at the same ratio as said input signal in synchronism with said storage equipment, a multiplier to which said storage equipment and said function generator are connected for obtaining an output corresponding to the product of the output wave form voltage of said storage equipment and said function generator, an integrating circuit to which said multiplier is connected for integrating said output of said multiplier during the period $t'$ and transmitting said output as pulses at every period $t'$ in synchronism with said storage equipment, and a low pass filter to which said integrating circuit is connected for taking out the continuous wave form from the train of said pulses.

2. A device as claimed in claim 1, in which said storage equipment is a magnetic recorder.

3. A device as claimed in claim 1, in which said storage equipment is a storage tube.

4. A device as claimed in claim 1, in which said storage equipment is a delay line and a switching circuit.

References Cited in the file of this patent

UNITED STATES PATENTS

| | | |
|---|---|---|
| 1,735,037 | Carpe | Nov. 12, 1929 |
| 2,115,803 | Dudley | May 3, 1938 |
| 2,263,376 | Blumlein et al. | Nov. 18, 1941 |
| 2,430,038 | Wertz | Nov. 4, 1947 |
| 2,575,393 | Peterson et al. | Nov. 20, 1951 |